United States Patent Office 2,733,185
Patented Jan. 31, 1956

2,733,185

PRODUCTION OF HAZE-FREE AQUEOUS SOLUTIONS OF DIHYDROSTREPTOMYCIN AND ARTICLE THEREFOR

Herman Sokol, Hasbrouck Heights, N. J., assignor, by mesne assignments, to American Cyanamid Company, New York, N. Y., a corporation of Maine No Drawing. Application January 26, 1953, Serial No. 333,353

7 Claims. (Cl. 167—65)

The present invention relates to forming aqueous solutions of crystalline dihydrostreptomycin sulphate in glass containers and more particularly is concerned with the production of such solutions in glass containers in such a manner that the solutions are clear and free of haze.

The present invention is primarily concerned with forming haze-free solutions in glass vials and will be so described. The present invention is applicable to other types of glass containers and is not limited to glass vials which usually are of such a size as to hold a dose of dihydrostreptomycin sulphate.

Dihydrostreptomycin sulphate is customarily stored in bulk containers and thereafter glass vials are partially filled, usually with a single dose quantity of dry dihydrostreptomycin sulphate, taken from the storage containers. This may be done by the manufacturer or the subdivider. The vials containing anhydrous dihydrostreptomycin sulphate which is commonly referred to as "dry fill," ultimately reach the doctor or other dispenser of the antibiotic and when he is ready to use the medicine, the doctor adds the required amount of water to the vial and then injects the resulting aqueous solution into the patient. The aqueous solutions are usually prepared only a short time before use and dihydrostreptomycin sulphate is customarily sold in the dry condition.

Most of the dihydrostreptomycin sulphate sold in vials for parenteral use is amorphous and is produced by the well known freeze drying process. When the water is added to the vial containing amorphous dihydrostreptomycin sulphate a clear aqueous solution is formed. While at infrequent intervals the aqueous solution may have a slight haze this occurs so infrequently as not to be a serious matter.

Crystalline dihydrostreptomycin sulphate can be produced and some is sold but the crystalline form has a serious drawback. When water is added to the dry crystalline dihydrostreptomycin sulphate in the vial, almost invariably the resulting aqueous solution appears turbid and has a white haze or cloudiness. Doctors are very reluctant to use such a solution as the presence of the haze is taken as an indication that the dihydrostreptomycin is not pure or contains undesirable foreign matter. For this reason manufacturers and subdividers do not want to use crystalline dihydrostreptomycin sulphate and it is very difficult to sell the crystalline form despite the fact that the crystalline form is as good medically as the amorphous form. The haze does not affect the medicinal properties of the antibiotic but is a serious drawback to its acceptance and use.

I have discovered that if two steps are followed, the aqueous solution formed upon the addition of water to dry crystalline dihydrostreptomycin sulphate in a vial will be clear. Both steps or conditions must be observed to produce uniformly solutions free of haze. Clear, haze-free aqueous solutions of crystalline dihydrostreptomycin sulphate can be obtained consistently by (1) maintaining the dry dihydrostreptomycin sulphate out of contact with glass either in bulk or dosage quantities and (2) forming the aqueous solution in a silicone lined vial. Carrying out the second step without the first and vice versa, will not continuously result in clear solutions. If a quantity of crystalline dihydrostreptomycin sulphate is placed in a glass container and thereafter all or part of the crystals are transferred to a glass vial lined with a silicone coating, the aqueous solution formed in the vial will have a haze. Similarly, if crystalline dihydrostreptomycin sulphate is transferred from a glass container to a non-glass container, dissolved in water and the aqueous solution then placed in a silicone lined glass vial, the solution will have a haze. Conversely, maintaining the crystalline dihydrostreptomycin sulphate out of contact with glass as for example by storage in a plastic lined bag, will not prevent haze if the aqueous solution subsequently formed is placed in or formed in a non-coated glass vial.

The previous discussion on the occurrence of haze is based on comparative visual tests. If neither condition is observed, there will occur at infrequent intervals a non-coated vial containing a clear solution. This may occur, for example, two or three times out of a hundred. Conversely, if both conditions are observed, the incidence of hazy solutions is reversed. While the observance of either condition alone will increase the incidence of clear solutions, the majority of the solutions will have a haze and the haze may be the same as or somewhat less than the haze formed when neither condition is observed. This will become clearer when discussing the comparative examples.

The present invention is not limited to a particular type of silicone for the vial coating and the silicone may be an organopolysiloxane or an organo-silicone-halide, the last mentioned group of compounds frequently being referred to as halo-organo silanes. The siloxanes and silanes may be either in the monomeric or polymeric form or mixtures thereof. In addition the silanes may be partially or completely hydrolyzed and such hydrolyzed silanes may be used alone or with non-hydrolyzed silanes. The polymeric silicones such as polymeric alkylsiloxanes and the halo-organo silanes such as the alkyl-silicone chlorides have been found particularly suitable. The following silicones are illustrative: polymeric dimethyl siloxane, dimethyl dichlorosilane more than 50% hydrolyzed plus methyl trichlorosilane, dimethyl dichlorosilane and trimethyl chlorosilane, completely hydrolyzed and partially hydrolyzed dimethyl dichlorosilane.

The silicone coating may be applied in any suitable manner but preferably is applied in such a manner as to form a clear coating. The silicone may be dissolved in a solvent, for example chloroform, and the solution applied to the inner surface of the glass container. After evaporation of the solvent, the resulting silicone film or coating is clear. When an emulsion of a silicone in water is used to coat the glass container, the residual film after drying may have a slight haze or cloudiness. While a hazy or cloudy coating is satisfactory in preventing the formation of turbid or hazy solutions and is not opaque so that the container contents can not be seen, such a coating is not desirable from the standpoint of appearance. Water clear silicone films are preferred.

*Example I*

Into each of a number of non-coated glass vials, there was placed $1 \times 10^6$ micrograms of crystalline dihydrostreptomycin sulphate taken from glass containers. Both sterile and non-sterile dihydrostreptomycin sulphate was used. Then 3 ml. of distilled water was added to each vial yielding a solution of 250,000 mcg./ml. potency. The vials were carefully examined visually for haze which was not caused by the presence of obvious foreign matter such as fibers. Only one out of forty-five vials contained a clear solution. Forty-four out of forty-five vials contained a turbid or hazy solution.

*Example II*

Samples of crystalline dihydrostreptomycin sulphate were obtained from sources of manufacture entirely separate from the source of the dihydrostreptomycin sulphate used in Example I. These samples were obtained in glass containers and aqueous solutions were prepared in non-coated glass vials. Each solution had a haze. While the intensity of haze varied in different vials, the haze was sufficient in all vials to be quite undesirable.

*Example III*

Crystalline dihydrostreptomycin sulphate was placed in a plurality of vials as discussed in Example I. Part of the dihydrostreptomycin sulphate used in the vials had been maintained free of contact with glass and was taken from a drum lined with polyethylene resin. In a second group of vials, dihydrostreptomycin sulphate was used from a number of lots which had been stored dry in glass containers. Each group of vials included non-coated vials and silicone lined vials. Part of the silicone lined vials for each group were prepared using a chloroform solution of polymeric dimethyl silicone while the remainder in each group were prepared using an aqueous emulsion of the same silicone resin. Distilled water was added to each vial and the solution visually inspected for haze with the following results.

| Source of Material | Clarity of Solutions | |
|---|---|---|
| | Coated Vials | Non-Coated Vials |
| Resin lined drum | All clear | All had haze. |
| Glass container | All had haze | Do. |

Although the solutions in the silicone coated vials containing dihydrostreptomycin sulphate which had been stored in glass containers had a haze which was not as extreme as the solutions in the non-coated vials, the first mentioned solutions had a haze that was undesirable.

*Example IV*

Clear aqueous solutions of crystalline dihydrostreptomycin sulphate were transferred from silicone coated vials to non-coated vials. These formerly clear solutions developed a haze almost immediately upon being placed in the non-coated vials.

With respect to preparing aqueous solutions of crystalline dihydrosterptomycin sulphate in vials, these and other comparative tests show that:

A. If the dihydrostreptomycin sulphate is not allowed to contact glass and if the vial is lined with a silicone coating, then the aqueous solution in the vial will be clear;

B. If the dihydrostreptomycin sulphate is maintained out of contact with glass and if the vial is not coated with silicone, the aqueous solution in the vial will have a haze;

C. If the dihydrostreptomycin sulphate is allowed to contact glass and if the vial does have a silicone coating, then the aqueous solution will have a haze; and, D. If the dihydrostreptomycin sulphate is allowed to contact glass and if the vial does not have a silicone coating, then the aqueous solution will have a haze.

Under the conditions of "D," all of the solutions will have a haze except for the infrequent occurrence at widely spaced intervals of vials containing clear solutions. Under the conditions of "A," the incidence of clear and hazy solutions is the reverse of "D," that is, all of the solutions will be clear except for the infrequent occurrence of a hazy solution. If under "A" the solution does have a haze it usually will be relatively slight. Under "B" and "C," the incidence of hazy solutions is intermediate that of "A" and "D" with hazy solutions occurring too frequently to be satisfactory. Of the two conditions "B" and "C," condition "B" on the average is worse than "C" as the haze seems to be more extreme and occurs more frequently.

All of the determinations of haze or turbidity were made visually without the aid of instruments. This is the only test made by doctors and it is the visual appearance of the haze which causes doctors to reject solutions having a haze.

In referring to the crystalline dihydrostreptomycin sulphate as having been "maintained free of contact with glass" is meant that the dry crystals have not been allowed to contact glass for a substantial length of time. Crystalline dihydrostreptomycin sulphate, may for example, be precipitated from an aqueous alcohol solution in a glass container and clear solutions obtained if the dihydrostreptomycin is maintained free of contact with glass when dry or when dissolved in water until placed in the silicone lined vial.

I claim:

1. In the process of forming a substantially haze-free, clear, aqueous solution of crystalline dihydrostreptomycin sulphate, placing a dosage quantity of crystalline dihydrostreptomycin sulphate which has been maintained free of contact with glass in a glass container interiorly coated with a silicone lining whereby the addition of water to the glass container produces a substantially haze-free, aqueous solution of dihydrostreptomycin sulphate.

2. In the process of forming a substantially haze-free, clear, aqueous solution of crystalline dihydrostreptomycin sulphate in a glass container, the steps comprising obtaining crystalline dihydrostreptomycin sulphate and maintaining the crystalline dihydrostreptomycin sulphate free of contact with glass until placing the crystalline dihydrostreptomycin sulphate in a glass container interiorly coated with a silicone lining whereby upon the addition of water to the glass container there is produced a substantially haze-free, aqueous solution of dihydrostreptomycin sulphate.

3. In the process of forming a clear, haze-free, aqueous solution of crystalline dihydrostreptomycin sulphate in a glass vial, the steps comprising obtaining crystalline dihydrostreptomycin sulphate and thereafter maintaining the crystalline dihydrostreptomycin sulphate free of contact with glass until placing the crystalline dihydrostreptomycin sulphate in a glass vial coated on the interior with a clear silicone lining whereby the addition of water to the glass container produces a haze-free, aqueous solution of crystalline dihydrostreptomycin sulphate.

4. In the process of forming a substantially haze-free, clear, aqueous solution of crystalline dihydrostreptomycin sulphate in a glass container, the steps comprising obtaining a relatively larger quantity of crystalline dihydrostreptomycin sulphate and storing the crystalline dihydrostreptomycin sulphate in a relatively larger container out of contact with glass, and then sub-dividing the crystalline dihydrostreptomycin sulphate into a plurality of relatively smaller portions and placing each relatively smaller portion in a relatively smaller glass container coated on the interior with a clear silicone lining, whereby the addition of water to the smaller glass container produces a substantially haze-free, aqueous solution of crystalline dihydrostreptomycin sulphate.

5. In the process of forming dosage amounts of clear, substantially haze-free, aqueous solutions of crystalline dihydrostreptomycin sulphate in glass containers, the steps comprising obtaining crystalline dihydrostreptomycin sulphate and storing a relatively larger amount of the crystalline dihydrostreptomycin sulphate in a relatively larger container out of contact with glass until placing a relatively smaller dosage amount of the crystalline dihydrostreptomycin sulphate taken from the relatively larger container in a relatively smaller glass container interiorly lined with a clear silicone coating, whereby the addition of water to the relatively smaller glass container produces a substantially haze-free, aqueous solution of crystalline dihydrostreptomycin sulphate.

6. In the process of forming haze-free, clear, aqueous solutions of crystalline dihydrostreptomycin sulphate in glass containers, the steps comprising precipitating crystalline dihydrostreptomycin sulphate from aqueous methanol solutions of dihydrostreptomycin sulphate, drying the crystals, and placing the dry crystals of dihydrostreptomycin sulphate in a silicone lined glass container, the dry crystals having been maintained free of contact with glass whereby the addition of water to the glass container produces a substantially haze-free, aqueous solution of crystalline dihydrostreptomycin sulphate.

7. An article of manufacture comprising a glass container having the interior thereof coated with a silicone lining and having disposed in said container a quantity of crystalline dihydrostreptomycin sulphate uncontaminated by previous contact with glass.

References Cited in the file of this patent

UNITED STATES PATENTS

| | | |
|---|---|---|
| 2,474,704 | Thayer | June 28, 1949 |
| 2,504,482 | Goldman | Apr. 18, 1950 |
| 2,523,245 | Coppock | Sept. 19, 1950 |